US009686375B2

United States Patent
Kumar et al.

(10) Patent No.: US 9,686,375 B2
(45) Date of Patent: Jun. 20, 2017

(54) MEDIA INTELLIGENCE SUITE

(71) Applicant: Accenture Global Services Limited, Dublin (IE)

(72) Inventors: Madan Kumar, Bangalore (IN); Sameer Keshkamat, Bangalore (IN); Maheswari Venkatraman, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 176 days.

(21) Appl. No.: 14/635,496

(22) Filed: Mar. 2, 2015

(65) Prior Publication Data
US 2016/0065668 A1 Mar. 3, 2016

(30) Foreign Application Priority Data
Aug. 29, 2014 (IN) .......................... 4231/CHE/2014

(51) Int. Cl.
*H04L 29/08* (2006.01)
*H04L 29/06* (2006.01)

(52) U.S. Cl.
CPC ........ *H04L 67/325* (2013.01); *H04L 65/4084* (2013.01); *H04L 65/80* (2013.01)

(58) Field of Classification Search
CPC .... H04L 67/1085; H04L 67/36; H04L 67/325
USPC .......................... 709/219, 220, 221, 223, 224
See application file for complete search history.

(56) References Cited

U.S. PATENT DOCUMENTS

| | | | | |
|---|---|---|---|---|
| 7,519,038 B2 * | 4/2009 | Zhao | ...................... | H04L 47/10 370/338 |
| 2001/0052000 A1 * | 12/2001 | Giacalone, Jr. | ........ | G06Q 30/02 709/218 |
| 2002/0041398 A1 * | 4/2002 | Ikeda | .................. | H04N 1/32101 358/402 |
| 2010/0131671 A1 * | 5/2010 | Kohli | ...................... | H04L 65/60 709/233 |

OTHER PUBLICATIONS

"A Taxonomy and Survey of Content Delivery Networks"—Pathan et al, University of Melbourne, Aug. 2010 http://www.cloudbus.org/cdn/reports/CDN-Taxonomy.pdf.*

(Continued)

*Primary Examiner* — Randy Scott
(74) *Attorney, Agent, or Firm* — Harrity & Harrity, LLP

(57) ABSTRACT

A device may receive an indication to determine status information associated with a media content delivery of media content. The media content may be delivered via a content delivery system. The device may determine, based on information provided by devices included in the content delivery system, progress information associated with the media content delivery. The progress information may identify progress, associated with the media content delivery, with respect to one or more steps, associated with delivering the media content, performed by the devices included in the content delivery system. The device may determine the status information, associated with the media content delivery, based on the progress information. The status information may indicate the status of the media content delivery. The device may provide the status information such that the status information may be displayed as a visual indication of the status of the media content delivery.

20 Claims, 17 Drawing Sheets

(56) References Cited

OTHER PUBLICATIONS

Huang et al. "Measuring and Evaluating Large-Scale CDNs," http://personal.ie.cuhk.edu.hk/~dmchiu/IMC08-huang.pdf, Oct. 20, 2008, 14 pages.
Manivannan, "A Framework to Enhance Quality of Service for Content Delivery Network Using Web Services: A Review," http://ijcsi.org/papers/IJCSI-8-5-2-275-282.pdf, Sep. 2011, 8 pages.
Cisco, "Wholesale Content Delivery Networks: Unlocking New Revenue Streams and Content Relationships," http://www.cisco.com/c/en/us/products/collateral/video/content-delivery-engine-series/white_paper_c11-710667.html, Jul. 15, 2011, 16 pages.

* cited by examiner

| Content Delivery System | | | |
|---|---|---|---|
| Content Name | State | Performance Criteria | Forecast |
| Media Content 1 | In Progress | -- | Hours |
| Media Content 2 | Error | Fail | Days |
| Media Content 3 | Complete | Pass | -- |

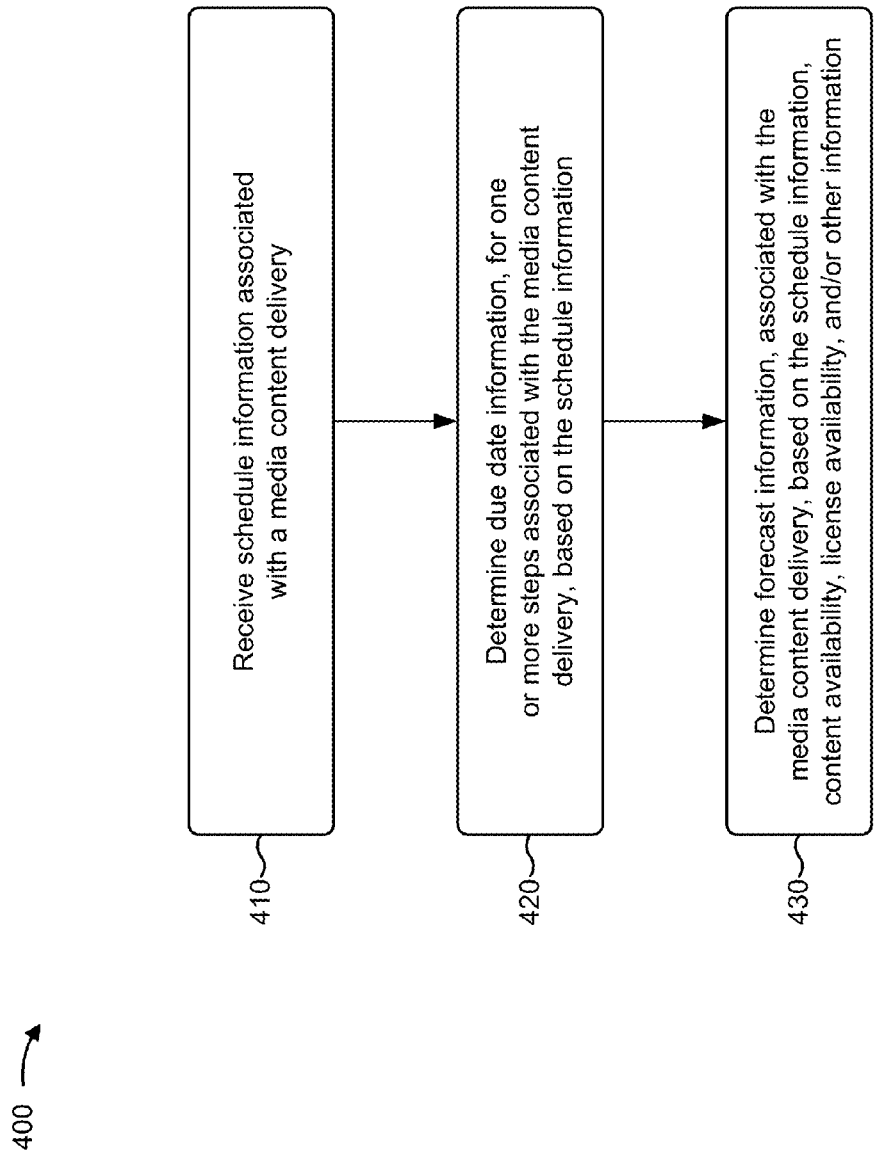

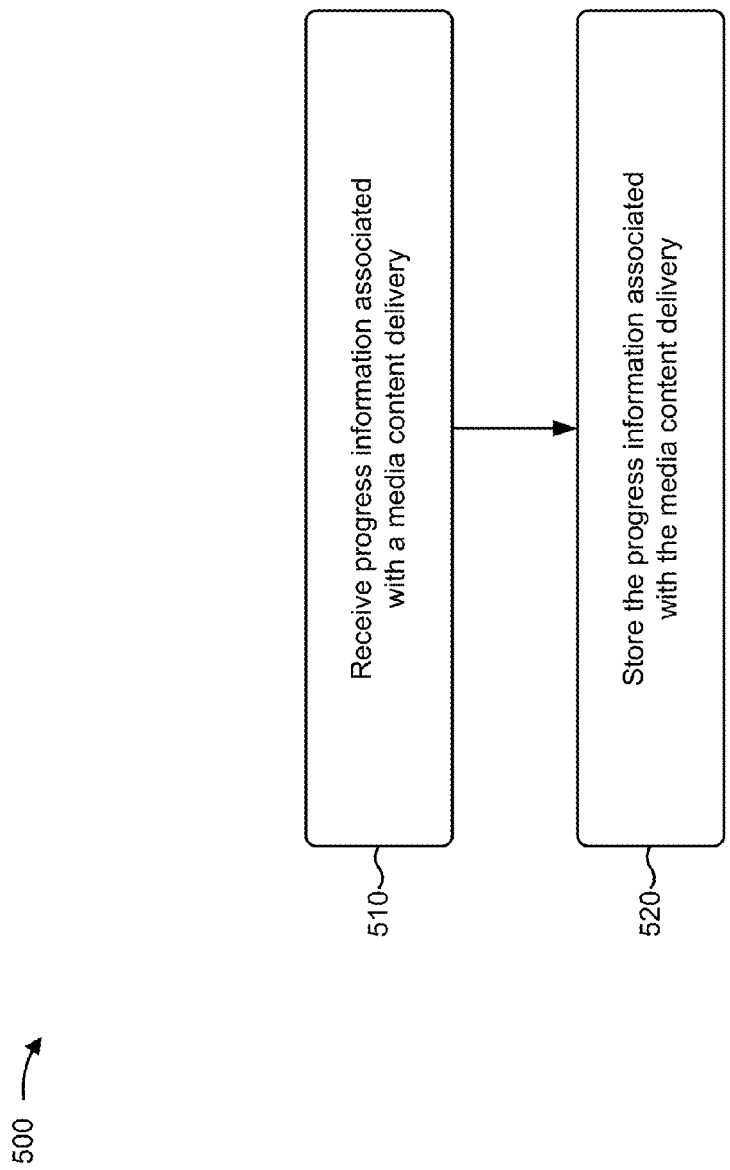

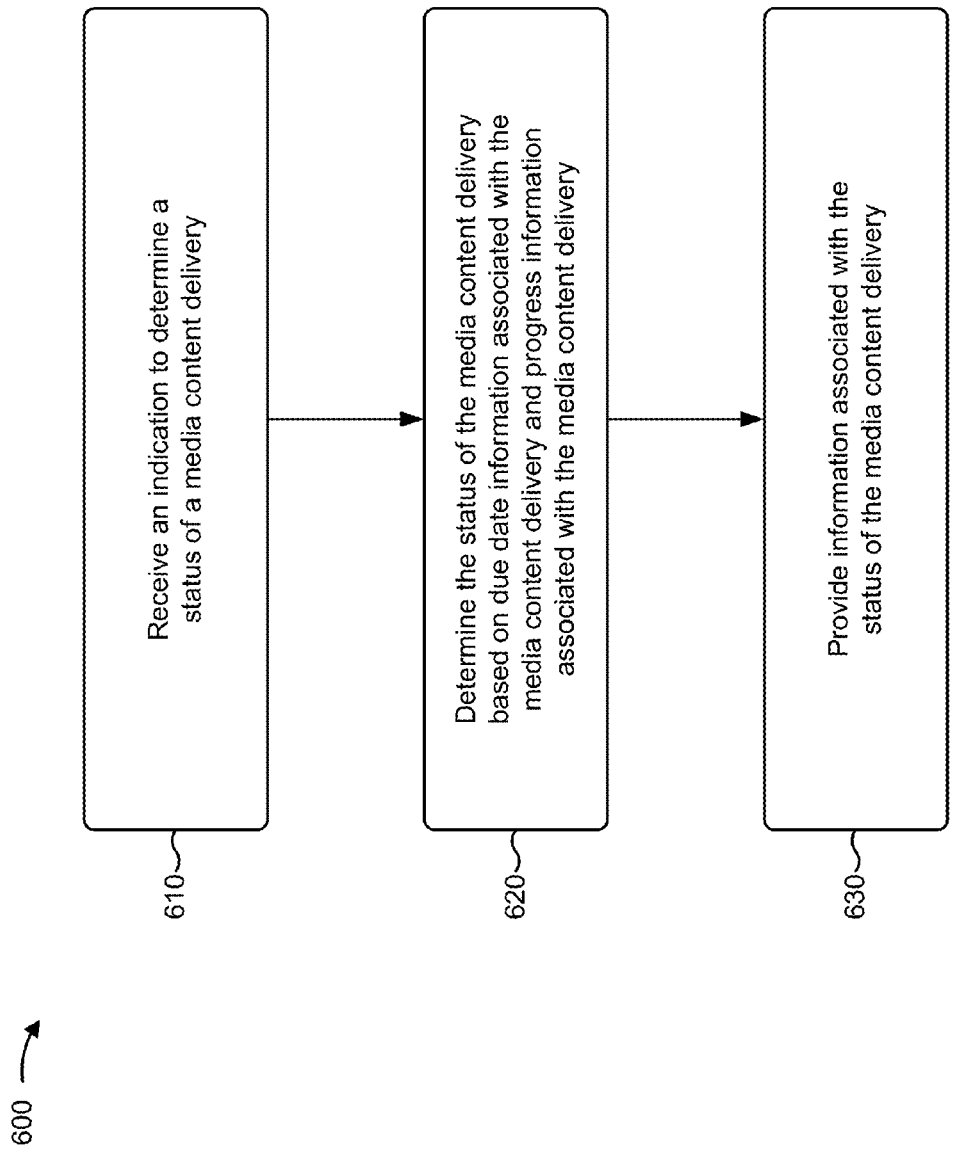

| Program Name | Schedule Received | Create Work-Order | Request Content | Content Received | Content Storage | Transcoding | Syndication Delivery | Licenses Information | Partner Content Delivery |
|---|---|---|---|---|---|---|---|---|---|
| Program 1 | ✓ | ✓ | ✓ | ✓ | ✓ | ⧗ | ⧗ | ✓ | ⧗ |

FIG. 9B

| Program Schedules | Content Delivery Summary | | |
|---|---|---|---|
| | Transfer Status | KPI Status | Estimate to Complete |
| NBA Action | Delivery Error | Failed | -- |
| UEFA Champions League Final | Complete | Success | -- |
| NBA Finals '09 | In Progress | -- | 20 mins |
| Football's Greatest | In Progress | -- | 50 mins |
| NBA Playoffs | Complete | Failed | -- |

FIG. 10A

MEDIA INTELLIGENCE SUITE

RELATED APPLICATION

This application claims priority under 35 U.S.C. §119 to Indian Provisional Patent Application No. 4231/CHE/2014, filed on Aug. 29, 2014, the content of which is incorporated by reference herein in its entirety.

BACKGROUND

A content provider may license media content (e.g., owned and/or produced by the content provider) to a client (e.g., a content distributor) for broadcast. The content may be delivered from the content provider to the client via a content delivery system.

SUMMARY

According to some possible implementations, a device may include one or more processors to: receive an indication to determine status information associated with a media content delivery of media content, where the media content may be delivered via a content delivery system; determine, based on information provided by devices included in the content delivery system, progress information associated with the media content delivery, where the progress information may identify progress, associated with the media content delivery, with respect to one or more steps, associated with delivering the media content, performed by the devices included in the content delivery system; determine the status information, associated with the media content delivery, based on the progress information, where the status information may indicate the status of the media content delivery; and provide the status information, where the status information may be presented for display as a visual indication of the status information in order to identify the status of the media content delivery.

According to some possible implementations, a computer-readable medium may store one or more instructions that, when executed by one or more processors, cause the one or more processors to: receive an indication to determine status information associated with a media content delivery of media content, where the media content may be delivered via a content delivery system; receive progress information associated with the media content delivery, where the progress information may be provided by one or more devices of the content delivery system, and where the progress information may identify progress, associated with the media content delivery, with respect to one or more steps associated with delivering the media content, where the one or more steps may be performed by the one or more devices of the content delivery system; determine the status information based on the progress information, where the status information may indicate the status of the media content delivery; and provide, for display, the status information, where the status information may be provided for display as a visual indication of the status information.

According to some possible implementations, a method may include: receiving, by a device, an indication to determine status information associated with a media content delivery of media content, where the media content may be delivered via a content delivery system; determining, by the device and based on information provided by devices included in the content delivery system, progress information associated with the media content delivery, where the progress information may identify progress, associated with the media content delivery, with respect to one or more steps, associated with delivering the media content, performed by the devices included in the content delivery system; determining, by the device, due date information associated with the media content delivery, where the due date information may include information indicating when the one or more steps are to be completed; determining, by the device, the status information, associated with the media content delivery, based on the progress information and the due date information, where the status information may indicate the status of the media content delivery; and providing, by the device, the status information, where the status information may be provided to allow a user to view the status information.

BRIEF DESCRIPTION OF THE DRAWINGS

FIGS. 1A-1C are diagrams of an overview of an example implementation described herein;

FIG. 4A is a flow chart of an example process for determining due date information, associated with a media content delivery, and forecast information associated with the media content delivery;

FIG. 5 is a flow chart of an example process for receiving and storing progress information associated with a media content delivery;

FIG. 6 is a flow chart of an example process for providing information associated with a status of a media content delivery;

FIGS. 9A and 9B are diagrams of an additional example implementation relating to the example process shown in FIG. 6; and FIGS. 10A and 10B are examples of user interfaces relating to the example process shown in FIG. 6.

DETAILED DESCRIPTION

Figure 1A:
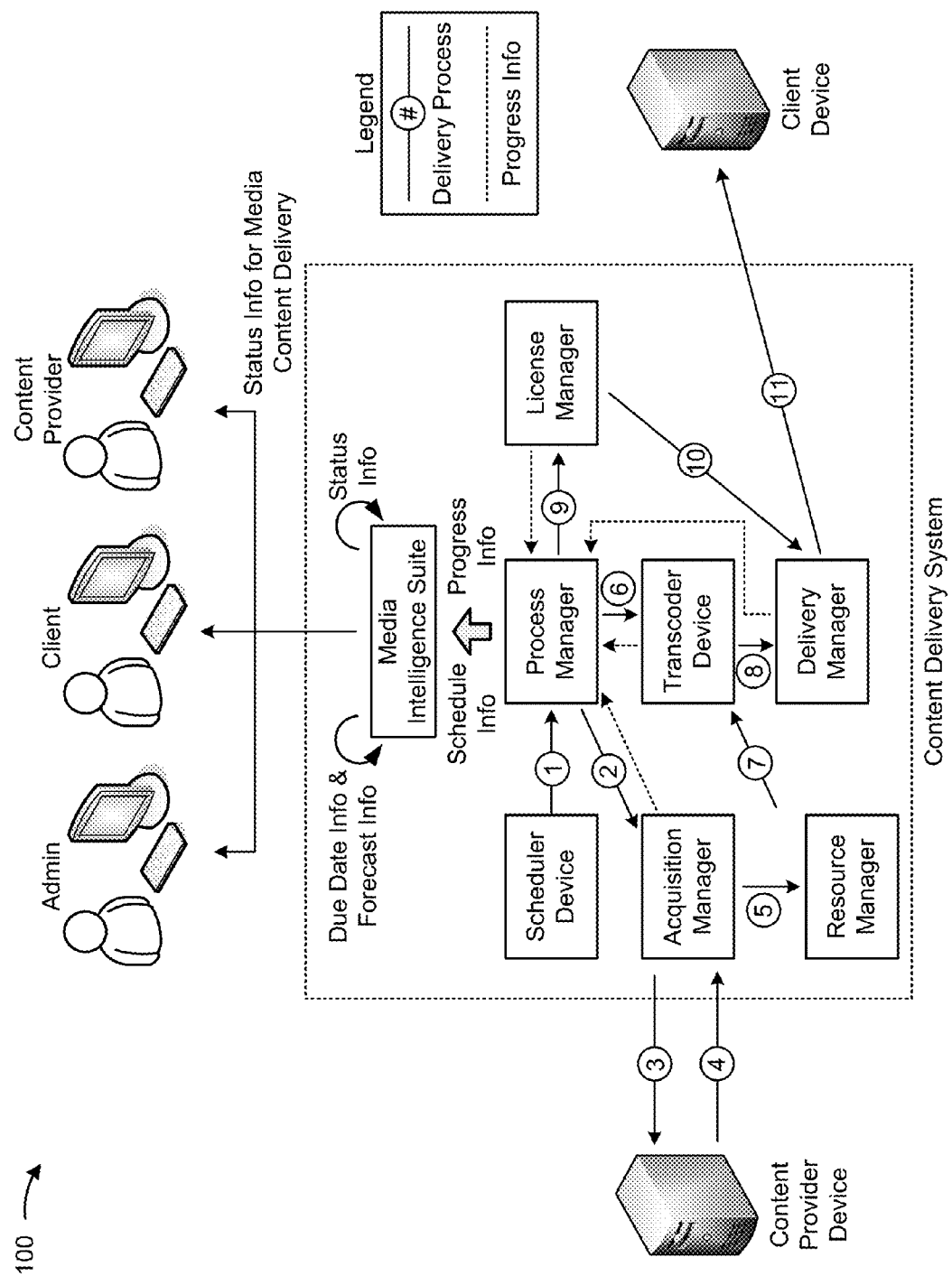

The following detailed description of example implementations refers to the accompanying drawings. The same reference numbers in different drawings may identify the same or similar elements.

A content provider may license media content (e.g., owned and/or produced by the content provider) to a client (e.g., a content distributor) for broadcast. Delivery of the media content to the client (e.g., via a content delivery system) may involve delivering the content to the client in a safe and/or reliable manner. However, a status of such a delivery of media content may be difficult to ascertain. For example, once the media content is submitted for transport to the client, the ensuing steps until delivery may have limited visibility to the content provider, the client, and/or an administrator of the content delivery system. This can lead to anxiety on the part of the client, and may cause a surprise when the media content is not received on time or experiences a delay in receipt, even though the problem may not be associated with the content provider's system. This may result in reduced client satisfaction even though the content provider is satisfying the content provider's obligations. A reporting mechanism that is capable of providing an up-to-date status and/or content delivery performance information (e.g., as related to key performance indicators (KPIs)), associated with the media content being delivered via the content delivery system, may be useful to the client, the content provider, and/or the administrator of the content delivery system. This may also reduce overhead of the content provider and/or the client (e.g., such that there is no need to maintain cumbersome tracking or record keeping mechanisms).

Implementations described herein may allow a media intelligence suite (MIS) device, associated with a content delivery system, to determine and provide information associated with a status of media content, being delivered to a client via the content delivery system, with respect to multiple devices of the content delivery system, such as a scheduler, an acquisition manager, a transcoder, a license and product manager, a process manager, a resource manager, a delivery manager, or the like. In some implementations, the MIS device may determine a status of the media content delivery by receiving information from the devices of the content delivery system. Additionally, or alternatively, the MIS device may be capable of forecasting a delivery time for the content based on information gathered from these devices. Additionally, or alternatively, the MIS device may provide (e.g., to the content provider, to the client, etc.) performance information that provides a status for multiple items of media content being delivered via the content delivery system. In some implementations, the MIS device may also be capable of providing a delivery alert if a due date is at risk of not being satisfied, and/or may be capable of retriggering a step of the content delivery process in the event of a due date being unsatisfied.

FIGS. 1A and 1B are diagrams of an overview of an example implementation 100 described herein. For the purposes of example implementation 100, assume that a scheduler device, included in a content delivery system, has received schedule information indicating that media content is to be provided, via the content delivery system, to a client device (e.g., a device associated with a content distributor) for broadcast at a particular time. Further, assume that a content provider device transports the media content (produced by the content provider) that is to be provided to a client device via a content delivery system.

As shown in FIG. 1A, the content delivery system may perform a series of steps to deliver the media content. For example, the content delivery process may include the scheduler device providing the schedule information to a process manager (step 1). As shown, the process manager may provide the schedule information to a media intelligence suite (MIS) device associated with the content delivery system. The MIS device may determine using the logic built into the MIS device and based on the schedule information, due date information (e.g., information that identifies one or more dates by which one or more steps of the content delivery process are to be completed) and forecast information (e.g., information that identifies when the media content delivery is expected to be completed) associated with the media content delivery. The due date information and the forecast information may be stored for future use, as described below.

Continuing with the content delivery process, the process manager may create a work order associated with acquiring the media content, and may provide the work order to an acquisition manager (step 2). The acquisition manger may receive the work order, may request the media content from the content provider device (step 3), and may receive the media content from the content provider (step 4). The acquisition manager may provide the media content to a resource manager, where the media content may be stored and/or registered for transcoding (step 5). The process manager may send, to a transcoder device, a request to transcode the media content into the formats requested by the client (step 6). The resource manager may provide the media content to the transcoder device for transcoding (step 7). After transcoding is complete, the transcoder device may provide the media content to a delivery manager (step 8). The process manager may also provide, to a license manager, an indication that the license manager is to obtain license and product information (sometimes referred to as metadata) associated with the media content (step 9). The license manager may obtain the license and product information, and may provide the license and product information to the delivery manager (step 10). The delivery manager may attach the license and product information to the media content, and may provide the media content to the client device (step 11).

Throughout the content delivery process, one or more devices associated with the media content delivery may provide progress information associated with the media content delivery. For example, as shown by the dashed arrows in FIG. 1A, the acquisition manager, the transcoder device, the delivery manager, and the license manager may provide progress information, associated with the media content delivery, to the process manager. The process manage may aggregates the progress information and may send the aggregated progress information to the MIS device. Alternatively, the MIS device may be configured to (e.g., automatically) procure the progress information directly from the various devices.

The MIS device may then determine a status of the media content delivery (e.g., information that identifies the status of the media content delivery) based on the due date information and/or the progress information. After determining the due date information, the MIS device may then determine forecast information (e.g., information that identifies when the media content delivery is expected to be completed) associated with the media content delivery, based on the schedule and/or the progress information. In some implementations, the MIS device may determine (e.g., based on the due date information and the progress information), whether a due date associated with a step of the media content delivery has not been satisfied (e.g., exceeded the due date) and/or whether the delivery has stalled due to a failure at one of the process steps, and may retrigger the step of the media content delivery.

Additionally, or alternatively, the MIS device may provide information associated with the status. For example, as shown, the MIS device may provide information, associated with the status, such that an administrator (e.g., associated with the content delivery system), a client (e.g., associated with the client device), and/or a content provider may view the status of the media content delivery.

FIG. 1B shows an example of information, associated with statuses of three items of media content (e.g., media content 1, media content 2, and media content 3), that may be provided by the MIS device. As shown in FIG. 1B, the status information may identify a state of each delivery (e.g., in progress, error, complete), information indicating whether each media content delivery has satisfied performance criteria (e.g., fail, pass), and forecast information associated with each media content delivery (e.g., hours, days, etc.). In some implementations, a user (e.g., the administrator, the client, the content provider) may view additional information associated with a status of a media content delivery (e.g., by selecting the row corresponding the media content delivery). For example, the user may view additional information associated with the status of the delivery of media content 1 by selecting the first row of the table shown in FIG. 1B.

Figure 1C:
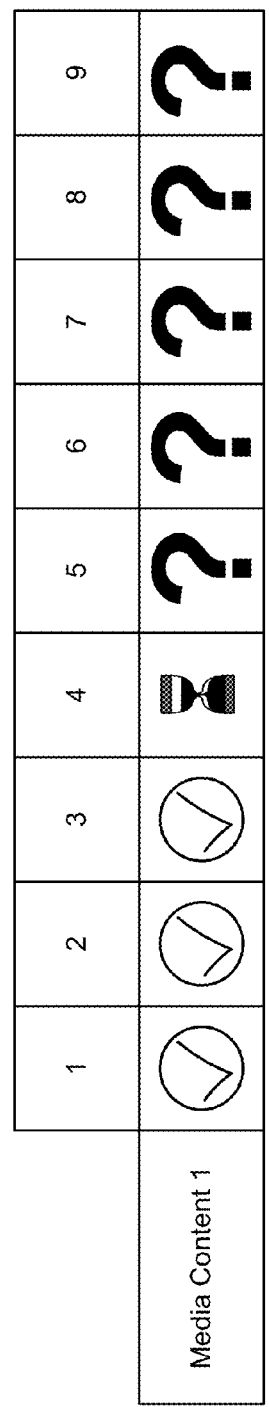

FIG. 1C shows an example of additional information associated with the status of the delivery of media content 1. As shown, the additional information may indicate that the first three steps of the delivery of media content 1 (e.g., through the acquisition manger requesting the media content from the content provider device) are complete, and that step 4 (e.g., receiving the media content from the content provider) of the delivery of the media content 1 is in progress.

In this way, a MIS device, associated with a content delivery system, may determine and provide a status of media content, being delivered to a client via the content delivery system, with respect to multiple devices of the content delivery system. In some implementations, based on configurations of the devices involved in the transfer of the media content, the MIS device may be capable of forecasting a delivery time for the content using information gathered from the devices of the content delivery system. Additionally, or alternatively, the MIS device may also be capable of providing a delivery alert if a due date is at risk of not being satisfied, and/or may be capable of retriggering a step of the content delivery process if a process step fails.

Figure 2:
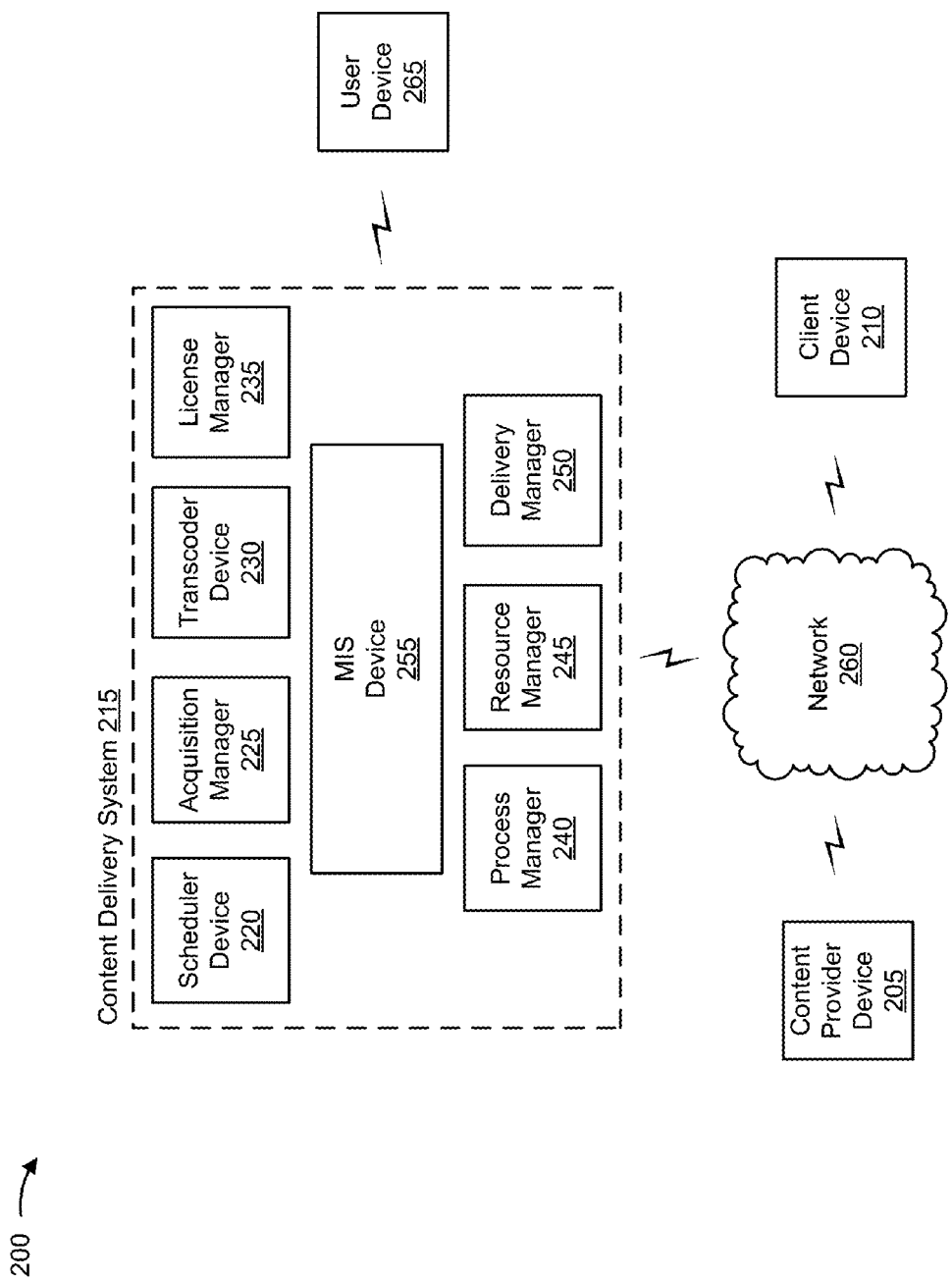
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content provider device 205, a client device 210, a content delivery system 215, a network 260, and a user device 265. As shown, content delivery system 215 may include a scheduler device 220, an acquisition manager 225, a transcoder device 230, a license manager 235, a process manager 240, a resource manager 245, a delivery manager 250, and an MIS device 255. Devices of environment 200 may interconnect via wired connections, wireless connections, or a combination of wired and wireless connections.

Content provider device 205 may include one or more devices capable of receiving, generating, storing, processing, and/or providing media content that is to be delivered to client device 210 via content delivery system 215. For example, content provider device 205 may include a computing device, such as a server device or a group of server devices. In some implementations, content provider device 205 may be associated with a producer, an owner, and/or a distributor of media content to be provided to client device 210.

Client device 210 may include one or more devices capable of receiving, storing, and/or processing media content that is provided by content provider device 205 via content delivery system 215. For example, client device 210 may include a computing device, such as a server device or a group of server devices. In some implementations, content provider device 205 may be associated with a broadcaster, a distributor, and/or a redistributor of media content to be provided by content provider device 205.

Content delivery system 215 may include a system (e.g., including one or more devices) associated with delivering media content, provided by content provider 205, to client device 210. In some implementations, content delivery system 215 may include scheduler device 220, acquisition manager 225, transcoder device 230, license manager 235, process manager 240, resource manager 245, delivery manager 250, and MIS device 255.

Scheduler device 220 may include a device capable of receiving, determining, storing, processing, and/or providing schedule information associated with media content. For example, scheduler device 220 may include a server device or a group of server devices. In some implementations, scheduler device 220 may be capable of providing the schedule information to one or more other devices, such as process manager 240 and/or MIS device 255.

Acquisition manager 225 may include a device capable of requesting, receiving, storing, processing, and/or providing media content (e.g., from content provider device 205). For example, acquisition manager 225 may include a computing device, such as a server device or a group of server devices. In some implementations, acquisition manager 225 may validate and/or register the media content after acquisition.

Transcoder device 230 may include a device capable of creating one or more renditions of media content in one or more formats for delivery to client device 210. For example, transcoder device 230 may include a computing device, such as a server device or a group of server devices. In some implementations, transcoder device 230 may also add watermark and/or copyright information to the media content (e.g., before delivery to client device 210).

License manager 235 may include a device capable of managing protection and licensing of media content files, and enabling controlled consumption of the media content and/or product information associated with the media content. For example, license manager 235 may include a computing device, such as a server device or a group of server devices. In some implementations, license manager 235 may act as an interface between a license store and client device 210. For example, license manager 235 may obtain a license and/or product information, associated with the media content, before the media content is provided to client device 210.

Process manager 240 may include a device capable of coordinating, orchestrating, synchronizing, or the like, steps performed by one or more other devices of content delivery system 215. For example, process manager 240 may include a computing device, such as a server device or a group of server devices. In some implementations, process manager 240 may receive, generate, store, process, and/or provide progress information, associated with a media content delivery, based on communicating with one or more other devices of content delivery system 215.

Resource manager 245 may include a device capable of managing media resources (e.g., executing distribution polices, queuing distribution tickets, etc.) associated with delivering media content via content delivery system 215. For example, resource manager 145 may include a computing device, such as a server device or a group of server devices.

Delivery manager 250 may include a device capable of delivering media content to client device 215. For example, delivery manager 250 may include a computing device, such as a server device or a group of server devices. In some implementations, delivery manager 250 may aggregate the media content, license information associated with media content, and/or product information associated with media content (e.g., metadata information, etc.), and deliver the aggregated information (e.g., the media content, the license information, the product information, etc.) to client device 210.

MIS device 255 may include a device capable of receiving, determining, generating, storing, processing, aggregating, and/or providing information associated with a status of a media content delivery (e.g., based on information provided by one or more devices of content delivery system 215). For example, MIS device 255 may include a computing device, such as a server device or a group of server devices. In some implementations, MIS device 255 may be capable of providing status information (e.g., a state of the delivery, an audit trail of the delivery, performance information associated with the delivery, etc.), associated with the media content delivery, for display to a user (e.g., an administrator of content delivery system 215, a client associated with client device 210, a content provider associated with content provider device 205, etc.). Additionally, or alternatively, MIS device 255 may be capable of forecasting an estimated delivery time for the media content. Additionally, or alternatively, MIS device 255 may be capable of performing automated failure resolution for a failed delivery of media content.

In some implementations, MIS device 255 may communicate with one or more devices of content delivery system 215 via middleware associated with MIS device 255. For example, one or more devices of content delivery system 215 may provide progress information via middleware that includes one or more elements (e.g., a database adapter, a Java message service adapter, a simple object access protocol (SOAP) over hypertext transfer protocol (HTTP) element, a file transfer protocol (FTP) adapter, a queuing element, a subscriber element, a publisher element, a receiver element, etc.). In some implementations, the middleware may allow MIS device 255 to receive information in a format that may be interpreted and/or used by MIS device 255 in order to determine the status of the media content delivery. Additionally, or alternatively, MIS device 255 may communicate with one or more devices of content delivery system 215 in another manner.

Network 260 may include one or more wired and/or wireless networks. For example, network 260 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, network 260 may include or be associated with a cloud environment.

User device 265 may include one or more devices capable of requesting, receiving, storing, providing, and/or displaying status information associated with a media content delivery. For example, user device 265 may include a communication and/or computing device, such as a mobile phone (e.g., a smart phone, a radiotelephone, etc.), a laptop computer, a tablet computer, a handheld computer, or a similar type of device. In some implementations, user device 265 may request and/or receive status information from MIS device 255. In some implementations, user device 265 may be associated with an administrator of content delivery system 215, a client associated with client device 210, and/or a content provider associated with content provider device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
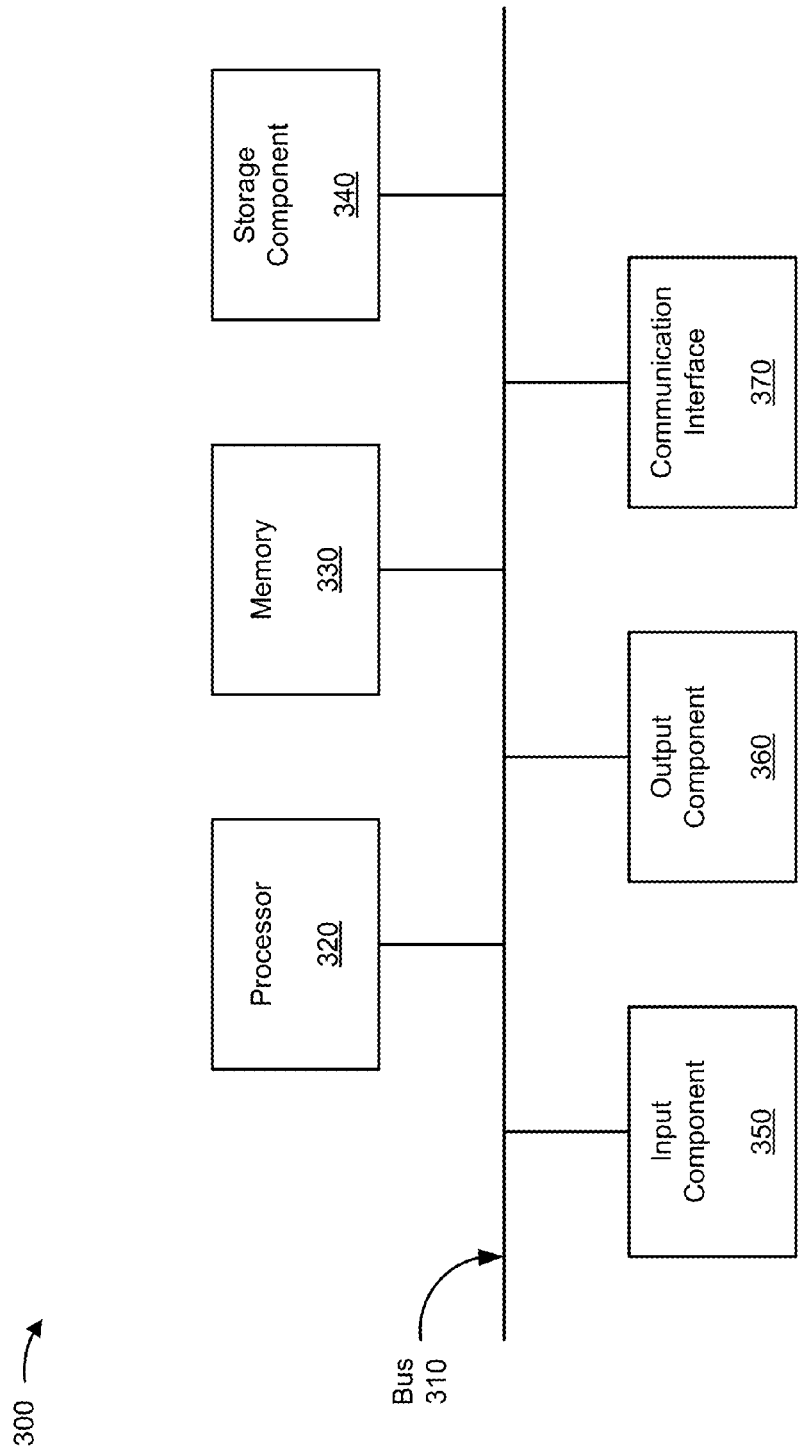
FIG. 3 is a diagram of example components of one or more devices of FIG. 2.

FIG. 3 is a diagram of example components of a device 300. Device 300 may correspond to content provider device 205, client device 210, scheduler device 220, acquisition manager 225, transcoder device 230, license manager 235, process manager 240, resource manager 245, delivery manager 250, MIS device 255, and/or user device 265. In some implementations, content provider device 205, client device 210, scheduler device 220, acquisition manager 225, transcoder device 230, license manager 235, process manager 240, resource manager 245, delivery manager 250, MIS device 255, and/or user device 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4A is a flow chart of an example process 400 for determining due date information, associated with a media content delivery, and forecast information associated with the media content delivery. In some implementations, one or more process blocks of FIG. 4A may be performed by MIS device 255. In some implementations, one or more process blocks of FIG. 4A may be performed by another device or a set of devices separate from or including MIS device 255, such as another device of environment 200.

As shown in FIG. 4A, process 400 may include receiving schedule information associated with a media content delivery (block 410). For example, MIS device 255 may receive schedule information associated with a media content delivery. In some implementations, MIS device 255 may receive the schedule information when scheduler device 220 and/or process manager 240 provides the schedule information.

Schedule information may include information that identifies a schedule associated with media content. For example, the schedule information may include a broadcast schedule, associated with a client, that identifies dates and/or times at which media content is to be broadcast, transmitted, or the like. In some implementations, the schedule information may be used to determine due date information (e.g., information identifying one or more due dates associated with delivering the media content) and/or forecast information (e.g., information identifying an estimation of when the media content delivery will be completed, as described below).

In some implementations, MIS device 255 may receive the schedule information from scheduler device 220. For example, scheduler device 220 may receive (e.g., based on user input, based on information received from client device 210) the schedule information for a period of time (e.g., a two month broadcast schedule, a three week broadcast schedule, etc.), and scheduler device 220 may provide the schedule information to MIS device 255. Additionally, or alternatively, MIS device 255 may receive the schedule information from process manager 240 (e.g., when process manager 240 receives the schedule information from scheduler device 220).

As further shown in FIG. 4A, process 400 may include determining due date information, for one or more steps associated with the media content delivery, based on the schedule information (block 420). For example, MIS device 255 may determine due date information, for one or more steps, associated with the media content delivery, based on the schedule information. In some implementations, MIS device 255 may determine the due date information after MIS device 255 receives the schedule information. Additionally, or alternatively, MIS device 255 may determine the due date information when MIS device 255 receives an indication that MIS device 255 is to determine the due date information.

Due date information may include information that identifies a date and/or a time by which one or more steps of the media content delivery process are to be completed. For example, the due date information may include information that identifies a date by which a work order is to be sent from process manager 240 to acquisition manager 225, a date by which acquisition manager 225 is to request the media content from content provider device 205, a date by which acquisition manager 225 is to receive the media content from content provider device 205, a date by which acquisition manager 225 is to send the media content to resource manager 245 for storage, a date by which transcoder device 230 is to complete transcoding the media content, a date by which transcoder device 230 is to provide the media content to delivery manager 250, a date by which license manager 235 is create and/or receive license and product information associated with the media content, a date by which delivery manager 250 is to send the media content (including the license and product information) to client device 210, and/or another date by which another step of the content delivery process is to be completed.

In some implementations, MIS device 255 may determine the due date information based on the schedule information. For example, assume that a client wishes to transmit (e.g., broadcast, distribute, etc.) media content on September 2, and that schedule information associated with the transmission, is provided to MIS device 255 42 days in advance of the transmission date (i.e., July 22). Here, MIS device 255 may determine due dates as follows: July 26 as a date by which a work order is to be sent from process manager 240 to acquisition manager 225 (e.g., 10% of days until the transmission date=42 days×0.10≈4 days 4 days after July 22=July 26), July 30 as a date by which acquisition manager 225 is to request the media content from content provider device 205 (e.g., 20% of days until the transmission date=42 days×0.20≈8 days 8 days after July 22=July 30), August 12 as a date by which acquisition manager 225 is to receive the media content from content provider device 205 (e.g., 50% of days until the transmission date=42 days×0.50≈21 days 21 days after July 22=August 12), August 16 as a date by which acquisition manager 225 is to send the media content to resource manager 245 for storage (e.g., 60% of days until the transmission date=42 days×0.60≈25 days 25 days after July 22=August 16), August 20 as a date by which transcoder 230 is to complete transcoding the media content (e.g., 70% of days until the transmission date=42 days× 0.70≈29 days 29 days after July 22=August 20), August 25 as a date by which transcoder 230 is to provide the media content to delivery manager 250 (e.g., 80% of days until the transmission date=42 days×0.80≈34 days 34 days after July 22=August 25), August 31 a date by which license manager 235 is create and/or receive license and product information associated with the media content (e.g., 95% of days until the transmission date=42 days×0.95≈40 days 40 days after July 22=August 31), and August 31 as a date by which delivery manager 250 is to send the media content (including the license and product information) to client device 210 (e.g., 95% of days until the transmission date=42 days× 0.95≈40 days 40 days after July 22=August 31). This is simply one example of how due date information can be determined. In some implementations, MIS device 255 may determine the due date information in another manner.

In some implementations, MIS device 255 may store the due date information for future use. For example, MIS device 255 may store the due date information in order to determine, at a later time, whether a due date has not been satisfied (e.g., when a step has not been completed by the due date). In some implementations, MIS device 255 may perform automated failure resolution based on determining that a due date has not been satisfied, as described below. Additionally, or alternatively, MIS device 255 may store the due date information in order to provide the due date information to a user (e.g., an administrator, a client, a content provider, etc.), as described below.

In some implementations, MIS device 255 may modify the due date information based on progress information associated with the media content delivery. Continuing with the above example, MIS device 255 may receive progress information indicating that acquisition manager 225 receives the media content from content provider device 205 on August 10 (i.e., two days before the August 12 due date). Here, MIS device 255 may modify due date information, based on the progress information, by modifying (e.g., recalculating, reducing by two days, etc.) due dates for one or more subsequent steps.

As further shown in FIG. 4A, process 400 may include determining forecast information, associated with the media content delivery, based on the schedule information, content availability, license availability, and/or other information (block 430). For example, MIS device 255 may determine forecast information, associated with the media content delivery, based on the schedule information, content availability, license availability, and/or other information. In some implementations, MIS device 255 may determine the forecast information after MIS device 255 receives the schedule information. Additionally, or alternatively, MIS device 255 may determine the forecast information when MIS device 255 receives an indication that MIS device 255 is to determine the forecast information.

Forecast information may include information that identifies an estimation of when the media content delivery (e.g., to client device 210) will be completed. For example, the forecast information may include information that identifies a date (e.g., August 31, April 3, etc.), a time of day (e.g., 9:00 a.m., 6:30 p.m.), an amount of time (e.g., 40 minutes, 5 hours, 3 weeks, etc.), a range of time (e.g., 30 minutes-5 hours, 2 days-7 days, etc.) a range of dates (e.g., August 31-September 1, a first week of April, etc.) and/or another type of information that may identify when the media content delivery will be completed.

Figure 4B:
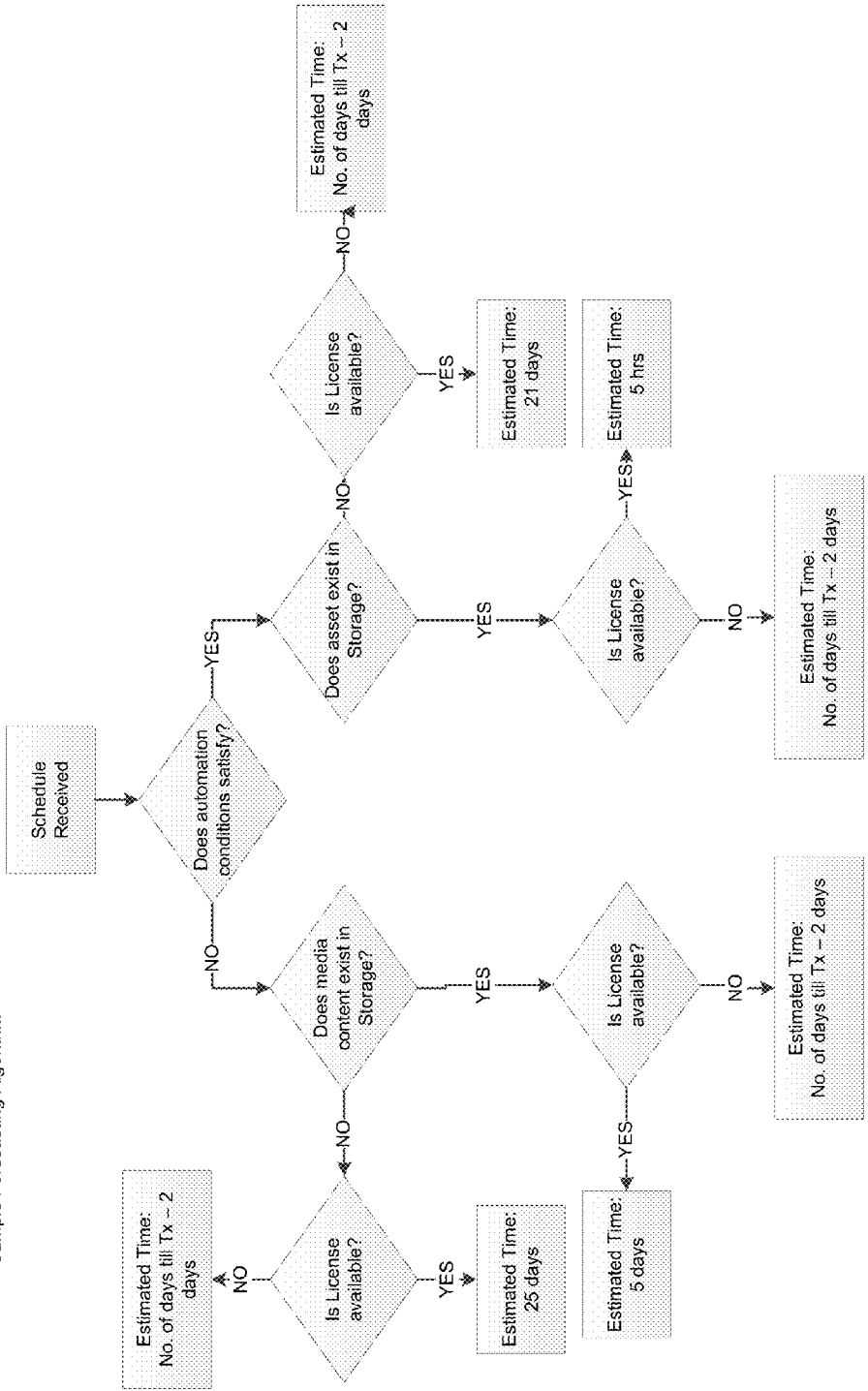
FIG. 4B is a flow chart of an example forecast algorithm for determining forecast information associated with a media content delivery.

In some implementations, MIS device 255 may determine the forecast information based on a forecasting algorithm stored or accessible by MIS device 255. For example, MIS device 255 may store or have access to a forecasting algorithm that uses, as inputs, information associated with the media content, and provides, as an output, the forecast information, including an estimate of when the media content delivery will be completed, an estimate of when one or more steps of the media content delivery will be completed, or the like. As described below, FIG. 4B shows a flow chart of an example forecasting algorithm that may be used by MIS device 255 to determine the forecast information.

In some implementations, MIS device 255 may store the forecast information for future use. For example, MIS device 255 may store the forecast information in order to provide the forecast information to a user (e.g., an administrator, a client, a content provider, etc.) as described below.

In some implementations, MIS device 255 may modify the forecast information based on progress information associated with the media content delivery. For example, MIS device 255 may receive progress information indicating that acquisition manager 225 receives the media content from content provider device 205 on August 10 (i.e., two days before the August 12 due date). Here, MIS device 255 may modify the forecast information (e.g., by determining forecast information that identifies an earlier forecast date, etc.) based on the progress information.

Although FIG. 4A shows example blocks of process 400, in some implementations, process 400 may include additional blocks, fewer blocks, different blocks, or differently arranged blocks than those depicted in FIG. 4A. Additionally, or alternatively, two or more of the blocks of process 400 may be performed in parallel.

FIG. 4B is a flow chart of an example forecast algorithm 450 for determining forecast information associated with the media content delivery FIG. 4A. In some implementations, one or more process blocks of FIG. 4B may be performed by MIS device 255. In some implementations, one or more process blocks of FIG. 4B may be performed by another device or a set of devices separate from or including MIS device 255, such as another device of environment 200.

For the purposes of FIG. 4B, assume that the forecasting algorithm is designed to estimate when each step of the content delivery process will complete based on a set of stored minimum times and maximum times associated with each step. For example, assume that the forecasting algorithm includes estimated completion times for steps of the content delivery process (depending on various conditions described below) as follows:

| Step | Minimum Time | Maximum Time |
| --- | --- | --- |
| Create Work Order | 30 minutes | 4 days |
| Request Media Content | 5 minutes | 4 days |
| Receive Media Content | 20 days | 20 days |
| Store Media Content | 5 minutes | 4 days |
| Transcode | 45 minutes | 4 days |
| Syndication Delivery | 1 hour | 4 days |
| License Information | Tx-7 days | Tx-2 days |
| Deliver Media Content | 2 hours | Tx-2 days | where "Tx-2 days" indicates two days prior to the date which the media content is to be broadcast, transmitted, or the like.

As shown in FIG. 4B, the forecasting algorithm may determine the forecast information based on the set of minimum times and maximum times, and based on determining whether automation conditions are satisfied for the media content delivery (e.g., whether a work order may be automatically generated for the media content delivery), whether the media content exists in storage (e.g., whether the media content is already available to content delivery system 215), and whether license and product information for the media content is available (e.g., whether the license and product information is already available to content delivery system 215). For example, as shown in FIG. 4B, MIS device 255 may determine forecast information indicating that the media content delivery will be complete in 5 hours (e.g., when automation conditions are satisfied, when the media content exists in storage, and when the license and product information is available), 5 days (e.g., when automation conditions are not satisfied, when the media content exists in storage, and when the license and product information is available), 21 days (e.g., when automation conditions are satisfied, when the media content does not exist in storage, and when the license and product information is available), 25 days (e.g., when automation conditions are not satisfied, when the media content does not exist in storage, and when the license and product information is available), or 2 days before a transmission of the media content (e.g., in various cases when the license and product information is not available). In this way, MIS device 255 may determine forecast information that includes an estimation of when one or more steps of the media content delivery will be completed, information that identifies an estimation when the media content delivery will be completed, or the like.

Although FIG. 4B shows example blocks of process 450, in some implementations, process 450 may include additional blocks, fewer blocks, different blocks, or differently arranged blocks than those depicted in FIG. 4B. Additionally, or alternatively, two or more of the blocks of process 450 may be performed in parallel.

FIG. 5 is a flow chart of an example process 500 for receiving and storing progress information associated with a media content delivery. In some implementations, one or more process blocks of FIG. 5 may be performed by MIS device 255. In some implementations, one or more process blocks of FIG. 5 may be performed by another device or a set of devices separate from or including MIS device 255, such as another device of environment 200.

As shown in FIG. 5, process 500 may include receiving progress information associated with a media content delivery (block 510). For example, MIS device 255 may receive progress information associated with a media content delivery. In some implementations, MIS device 255 may receive the progress information when another device provides the progress information, such as process manager 240. Additionally, or alternatively, MIS device 255 may receive the progress information based on sending a request to provide the progress information.

Progress information may include information that identifies progress associated with one or more steps of a media content delivery. For example, the progress information may include information indicating that a step is complete (e.g., an indication that the media content has been received from content provider device 205, an indication that a work order has been created, etc.), information indicating that a step is in progress (e.g., information indicating that transcoding of the media content is in progress, information indicating that the media content is in the process of being provided to delivery manager 250, etc.), information indicating that a step has yet to begin (e.g., information indicating that transcoding of the media content has yet to begin, information indicating that the media content has yet to be provided to delivery manager 250, etc.), information indicating that a step has experienced an error (e.g., information indicating that an error occurred when requesting license and product information for the media content, information indicating that an error occurred during transcoding of the media content, etc.), or the like.

In some implementations, MIS device 255 may automatically receive the progress information. For example, process manager 240 may be configured to provide progress information (e.g., gathered from one or more other devices of content delivery system 215) at particular intervals of time (e.g., every hour, every two days, etc.). As another example, process manager 240 may be configured to immediately provide progress information indicating that an error has occurred during the media content delivery.

Additionally, or alternatively, MIS device 255 may receive the progress information based on user input. For example, a user (e.g., an administrator of content delivery system 215, a client, a content provider, etc.) may provide input indicating that the user wishes to view status information associated with the media content. Here, MIS device 255 may request (e.g., from process manager 240, from one or more other devices of content delivery system 215, etc.) the progress information, and may receive the progress information in response to the request.

In some implementations, MIS device 255 may automatically (e.g., without user intervention) perform failure resolution based on receiving the progress information. For example, MIS device 255 may receive progress information indicating a failure (e.g., due to an error, due to a due date not being satisfied, etc.) associated with receiving the schedule information (e.g., due to corrupted information, incorrect information, etc.). In this example MIS device 255 may automatically request that schedule information be resent from scheduler device 220 to process manager 240. As another example, MIS device 255 may receive progress information indicating a failure associated with receiving licensing and product information (e.g., a stall due to lack of a license or product details, etc.). In this example, MIS device 255 may automatically instruct license manager 235 to re-request the license and product information. As yet another example, MIS device 255 may receive progress information indicating a failure associated with delivery of the media content by delivery manager 250. In this example, MIS device 255 may automatically instruct delivery manager 250 to re-attempt delivery of the media content. In this way, manual intervention (e.g., by an administrator of content delivery system 215) may not be required in order to resolve a failure associated with the media content delivery.

As further shown in FIG. 5, process 500 may include storing the progress information associated with the media content delivery (block 520). For example, MIS device 255 may store the progress information associated with the media content delivery. In some implementations, MIS device 255 may store the progress information after MIS device 255 receives the progress information.

In some implementations, MIS device 255 may store the progress information in a memory location (e.g., a RAM, a ROM, a cache, a hard disk, etc.) of MIS device 255. Additionally, or alternatively, MIS device 255 may provide the progress information to another device for storage. In some implementations, MIS device 255 may store information associated with the progress information, such as information that identifies the media content delivery corresponding to the progress information (e.g., such that MIS device 255 may determine progress information, associated with the media content delivery, at a later time).

In some implementations, MIS device 255 may update due date information associated with the media content. For example, MIS device 255 may store or have access to due date information, associated with the media content (e.g., as described above), and may update the due date information (e.g., revise one or more due dates) based on the progress information (e.g., as the media content delivery process is being completed).

Additionally, or alternatively, MIS device 255 may update forecast information associated with the media content. For example, MIS device 255 may store or have access to forecast information, associated with the media content (e.g., as described above), and may update the forecast information (e.g., re-run a forecasting algorithm) based on the progress information (e.g., as the media content delivery process is being completed).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing information associated with a status of a media content delivery. In some implementations, one or more process blocks of FIG. 6 may be performed by MIS device 255. In some implementations, one or more process blocks of FIG. 6 may be performed by another device or a set of devices separate from or including MIS device 255, such as another device of environment 200.

As shown in FIG. 6, process 600 may include receiving an indication to determine a status of a media content delivery (block 610). For example, MIS device 255 may receive an indication to determine a status of a media content delivery. In some implementations, MIS device 255 may receive the indication based on user input, as described below. Additionally, or alternatively, MIS device 255 may receive the indication when another device included in content delivery system 215, provides information indicating that MIS device 255 is to determine the status of the media content delivery.

A status of a media content delivery may include information that identifies a status of a media content delivery with regard to a content delivery process performed by content delivery system 215. For example, the status may be associated with due date information associated with the media content delivery, forecast information associated with the media content delivery, progress information associated with the media content delivery, performance information associated with the media content delivery (e.g., as described below), and/or another type of information associated with the media content delivery.

In some implementations, MIS device 255 may receive the indication based on user input. For example, a user (e.g., an administrator, a client, a content provider) may provide user input indicating that the user wishes to view the status of the media content delivery. Here, MIS device 255 may receive the indication based on the user input.

Additionally, or alternatively, MIS device 255 may receive the indication based on a configuration of MIS device 255. For example, MIS device 255 may be configured to determine (e.g., and provide) the status of the media content delivery at particular intervals of time (e.g., every hour, every seven days, etc.). As another example, MIS device 255 may be configured to determine (e.g., and provide) the status of the media content delivery at a particular time during the content delivery process (e.g., when the media content has been received, when transcoding of the media content has begun, when an error is experienced during the media content delivery, etc.).

As further shown in FIG. 6, process 600 may include determining the status of the media content delivery based on due date information associated with the media content delivery and progress information associated with the media content delivery (block 620). For example, MIS device 255 may determine the status of the media content delivery based on due date information associated with the media content delivery and progress information associated with the media content delivery. In some implementations, MIS device 255 may determine the status of the media content delivery when MIS device 255 receives the indication to determine the status of the media content delivery.

In some implementations, MIS device 255 may determine the status based on due date information and/or progress information. For example, MIS device 255 may determine that a first set of steps of the content delivery process is complete, that another step is in progress, and that a second set of steps have yet to begin. Here, MIS device 255 may also determine due date information for the second set of steps and/or may determine forecast information for the delivery of the media content.

In some implementations, MIS device 255 may determine the status based on the due date information. For example, MIS device 255 may compare the progress information and the due date information in order to determine whether a due date, associated with the media content delivery, has not been satisfied (i.e., whether a step has been completed by a corresponding due date). In some implementations, if the due date has not been satisfied or processing at a step has failed, then MIS device 255 may determine that a failure has occurred, and may attempt to automatically (e.g., without user intervention) resolve the failure, as described above. Additionally, or alternatively, MIS device 255 may determine that a failure has occurred, and may trigger a notification (e.g., a text message, an email, etc.) in order to notify a user (e.g., the administrator, the client, the content provider) of the failure and/or to indicate that manual resolution may be needed.

Additionally, or alternatively, MIS device 255 may determine the status in relation to performance information associated with the media content delivery. For example, MIS device 255 may store or have access to information that identifies a key performance indicator (KPI) associated with the media content delivery, and may determine the status based on the KPI. As an example, assume that MIS device 255 stores a KPI indicating that the media content is to be received within 20 days of receiving schedule information that identifies the media content. Here, MIS device 255 may determine, based on the progress information, whether the KPI has been satisfied (e.g., whether the media content was received within 20 days of receiving the schedule information). In some implementations, the KPI may be associated with the content provider (e.g., when the content provider wishes to monitor performance of content delivery system 215 based on the KPI), the client (e.g., when the client wishes to monitor performance of content delivery system 215 based on the KPI), and/or content delivery system 215 (e.g., when the administrator of content delivery system 215 wishes to monitor performance of content delivery system 215 based on the KPI).

As further shown in FIG. 6, process 600 may include providing information associated with the status of the media content delivery (block 630). For example, MIS device 255 may provide information associated with the status of the media content delivery (herein referred to as status information). In some implementations, MIS device 255 may provide the status information after MIS device 255 determines the status of the media content delivery.

In some implementations, MIS device 255 may provide the status information for display to a user (e.g., the administrator, the client, the content provider, etc.) via user device 265. For example, MIS device 255 may provide the status information for display via a user interface, associated with MIS device 255, of user device 265. In some implementations, the user interface may include information that allows the user to readily identify the status of the media content delivery. For example, the user interface may include a colored status view where, for example, a completed step may be identified in a green color, a step yet to be completed (e.g., in-progress, upcoming, etc.) may be identified in a yellow color, and a step that has experienced an error or has not satisfied a due date may be identified in a red color.

Additionally, or alternatively, the user interface may provide summary status information for multiple items of media content (e.g., an overall status, KPI information, a forecast delivery date, etc.), and the user may view detailed information for a particular item of media content (e.g., an indication whether each step has been completed, a due date for each step, etc.) by selecting the particular item of media content via the user interface.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
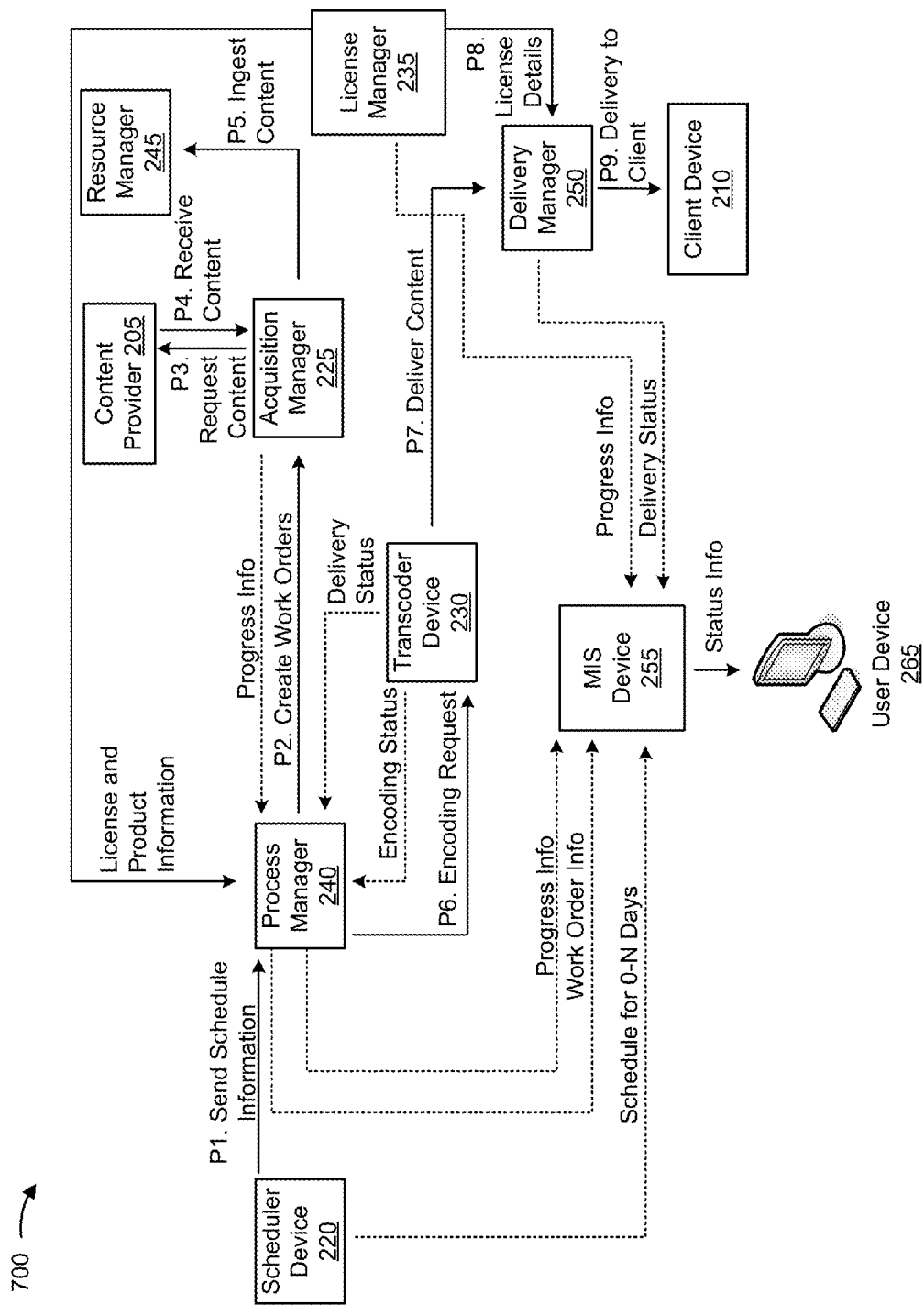
FIGS. 7A and 7B are diagrams of an example implementation relating to the example process shown in FIG. 6.
Figure 7B:

FIGS. 7A and 7B are diagrams of an example implementation 700 relating to example process 600 shown in FIG. 6. For the purposes of example implementation 700, and as shown by the solid arrows in FIG. 7A, assume that the media content delivery process includes a number of steps (e.g., similar to those described above). Further, assume that MIS device 255 stores or has access to due date information associated with a media content delivery (e.g., identified as Program 1). Finally, assume that MIS device 255 has received (e.g., based on user input via user device 265) an indication that MIS device 255 is to determine the status of the media content delivery, and that MIS device 255 has requested (e.g., from one or more devices of content delivery system 215) progress information associated with the media content delivery.

As shown by the dashed arrows in FIG. 7A, devices of content delivery system 215 (e.g., scheduler device 220, acquisition manager 225, transcoder device 230, license manager 235, process manager 240, and delivery manager 250) may provide progress information, associated with the media content delivery to MIS device 255, indicating that corresponding steps have been completed. As further shown, MIS device 255 may determine based on the progress information and the due date information, status information indicating that each step of the media content delivery is complete and that all due dates were satisfied.

As shown in FIG. 7B, MIS device 255 may provide, for display via user device 265, a user interface indicating that the media content delivery was successfully completed. As shown in FIG. 7B, the user interface may present a visual indicator (e.g., a check mark), to indicate that each step of the media content delivery is complete and that all due dates were satisfied.

As indicated above, FIGS. 7A and 7B are provided merely as an example. Other examples are possible and may differ from what was described with regard to FIGS. 7A and 7B.

Figure 8A:
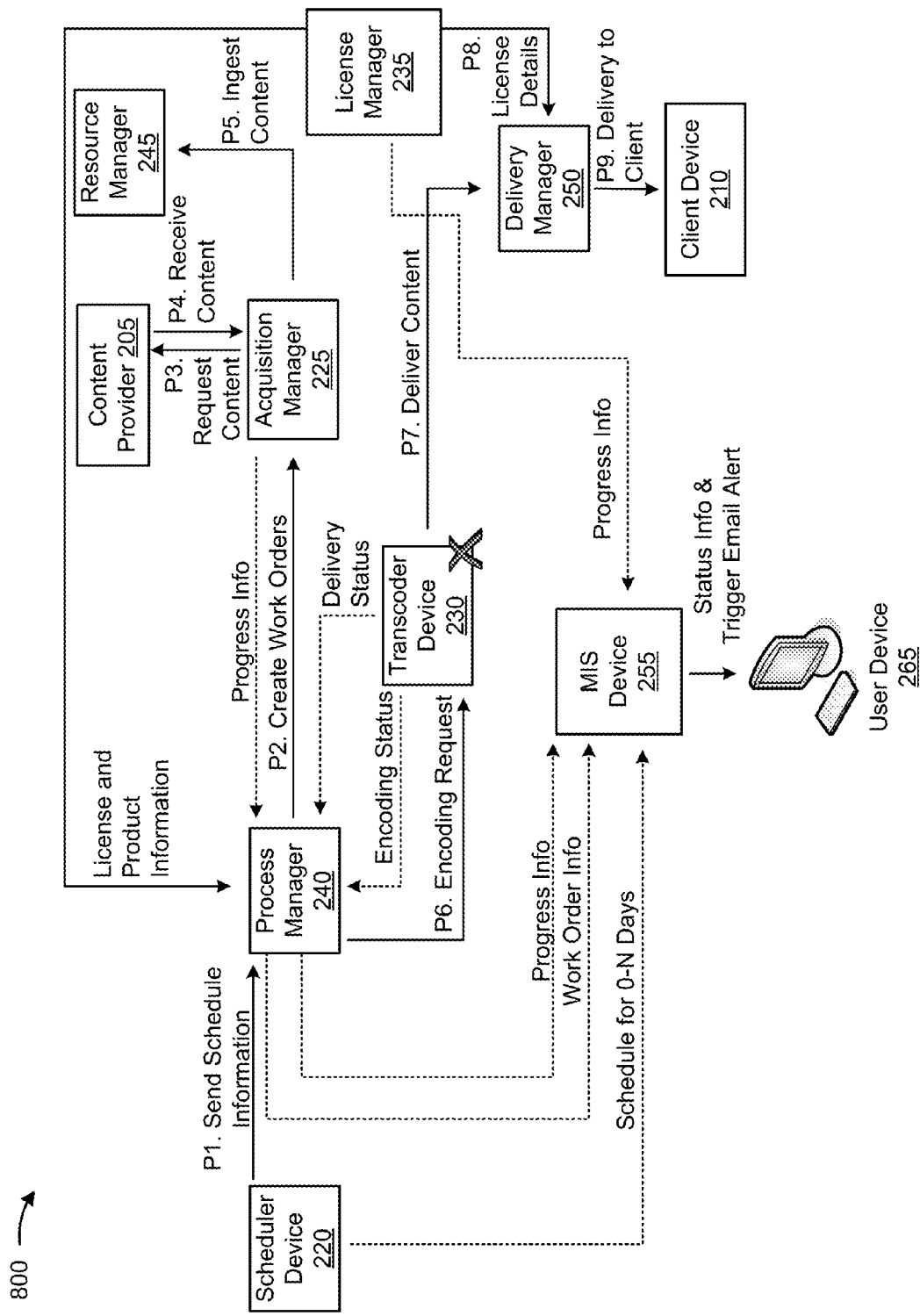
FIGS. 8A and 8B are diagrams of another example implementation relating to the example process shown in FIG. 6.
Figure 8B:

FIGS. 8A and 8B are diagrams of another example implementation 800 relating to example process 600 shown in FIG. 6. For the purposes of example implementation 800, and as shown by the solid arrows in FIG. 8A, assume that the media content delivery process includes a number of steps (e.g., similar to those described above). Further, assume that MIS device 255 stores or has access to due date information associated with a media content delivery (e.g., identified as Program 1). Finally, assume that MIS device 255 has received (e.g., based on user input via user device 265) an indication that MIS device 255 is to determine the status of the media content delivery, and that MIS device 255 has requested (e.g., from one or more devices of content delivery system 215) progress information associated with the media content delivery.

As shown by the dashed arrows in FIG. 8A, devices of content delivery system 215 (e.g., scheduler device 220, acquisition manager 225, license manager 235, and process manager 240) may provide progress information, associated with the media content delivery to MIS device 255, indicating that corresponding steps have been completed. As further shown, MIS device 255 may determine based on the progress information and the due date information, status information indicating that a set of steps (e.g., receiving a schedule, creating a work order, requesting the media content, receiving the media content, and receiving license and product information) has been completed in accordance with a set of corresponding due dates. However, as shown, MIS device 255 may determine status information indicating that a transcoding step was not completed before a corresponding due date or due to a processing failure at that step. As further shown, MIS device 255 may trigger an email alert (e.g., such that an email is sent to an administrator of content delivery system) regarding the unsatisfied due date associated with the transcoding step.

As shown in FIG. 8B, MIS device 255 may also provide, for display via user device 265, a user interface indicating that the set of steps was successfully completed, and that the transcoding step and subsequent steps have failed due to a due date not being satisfied (e.g., when all steps after a step with a unsatisfied due date are automatically displayed as failed). Here, since the license information step may be shown as complete since obtaining the license and product information may be independent from one or more other steps of the content delivery process.

As indicated above, FIGS. 8A and 8B are provided merely as an example. Other examples are possible and may differ from what was described with regard to FIGS. 8A and 8B.

Figure 9A:
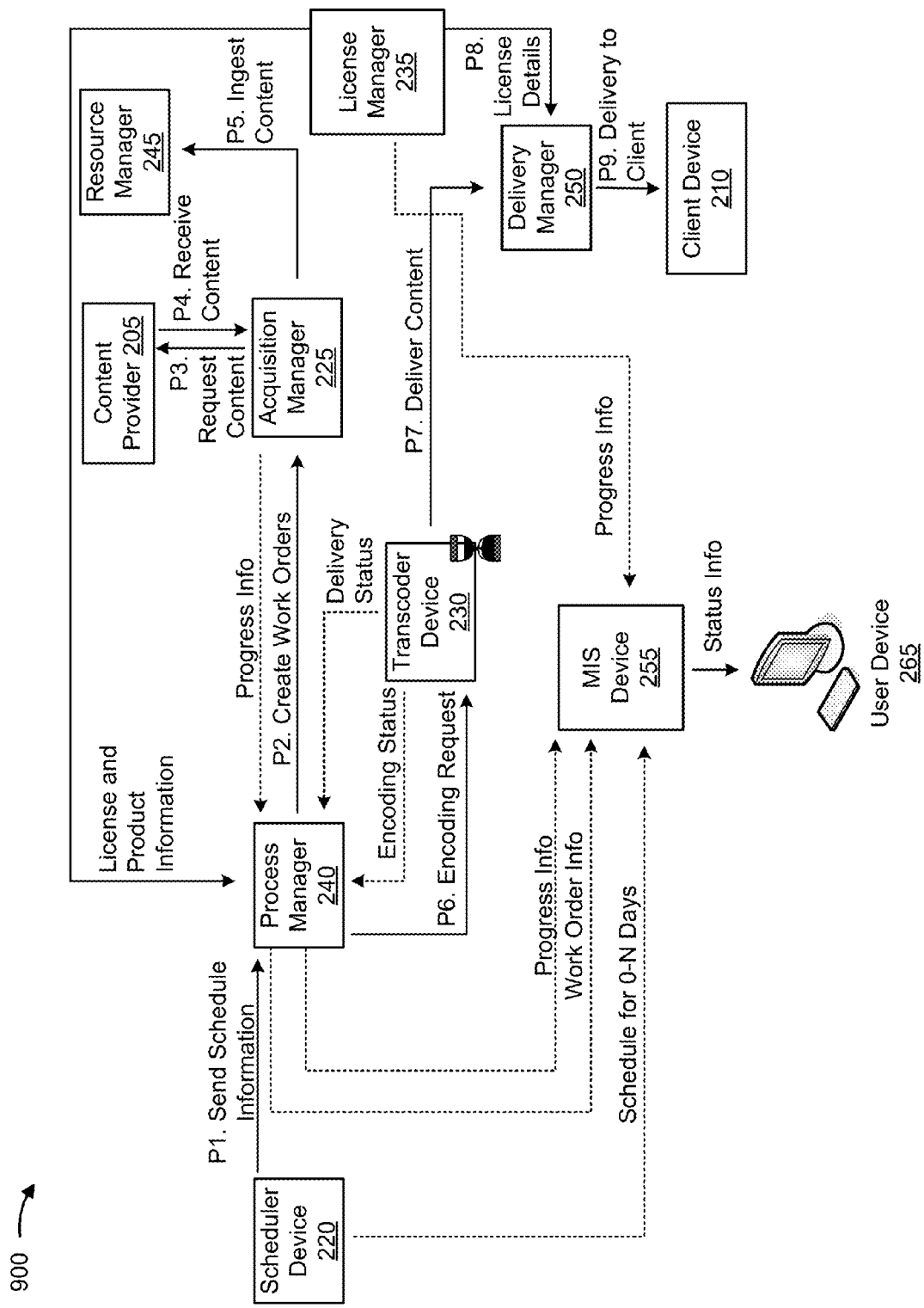

FIGS. 9A and 9B are diagrams of an additional example implementation 900 relating to example process 600 shown in FIG. 6. For the purposes of example implementation 900, and as shown by the solid arrows in FIG. 9A, assume that the media content delivery process includes a number of steps (e.g., similar to those described above). Further, assume that MIS device 255 stores or has access to due date information associated with a media content delivery (e.g., identified as Program 1). Finally, assume that MIS device 255 has received (e.g., based on user input via user device 265) an indication that MIS device 255 is to determine the status of the media content delivery, and that MIS device 255 has requested (e.g., from one or more devices of content delivery system 215) progress information associated with the media content delivery.

As shown by the dashed arrows in FIG. 9A, devices of content delivery system 215 (e.g., scheduler device 220, acquisition manager 225, license manager 235, and process manager 240) may provide progress information, associated with the media content delivery to MIS device 255, indicating that a first set of steps (e.g., receiving a schedule, creating a work order, requesting the media content, receiving the media content, storing the media content, and receiving license and product information) has been completed, and indicating that a second set of steps (e.g., transcoding the media content, delivering the media content) is in-progress.

As further shown, MIS device 255 may determine based on the progress information and the due date information, status information indicating that the first steps was completed in accordance with a set of corresponding due dates. As shown, MIS device 255 may also determine status information indicating that a due date for the transcoding step and a due date for the delivery step have been satisfied.

As shown in FIG. 9B, MIS device 255 may provide, for display via user device 265, a user interface indicating that the first set of steps was successfully completed, and that the transcoding step and subsequent steps are in progress.

As indicated above, FIGS. 9A and 9B are provided merely as an example. Other examples are possible and may differ from what was described with regard to FIGS. 9A and 9B.

Figure 10B:
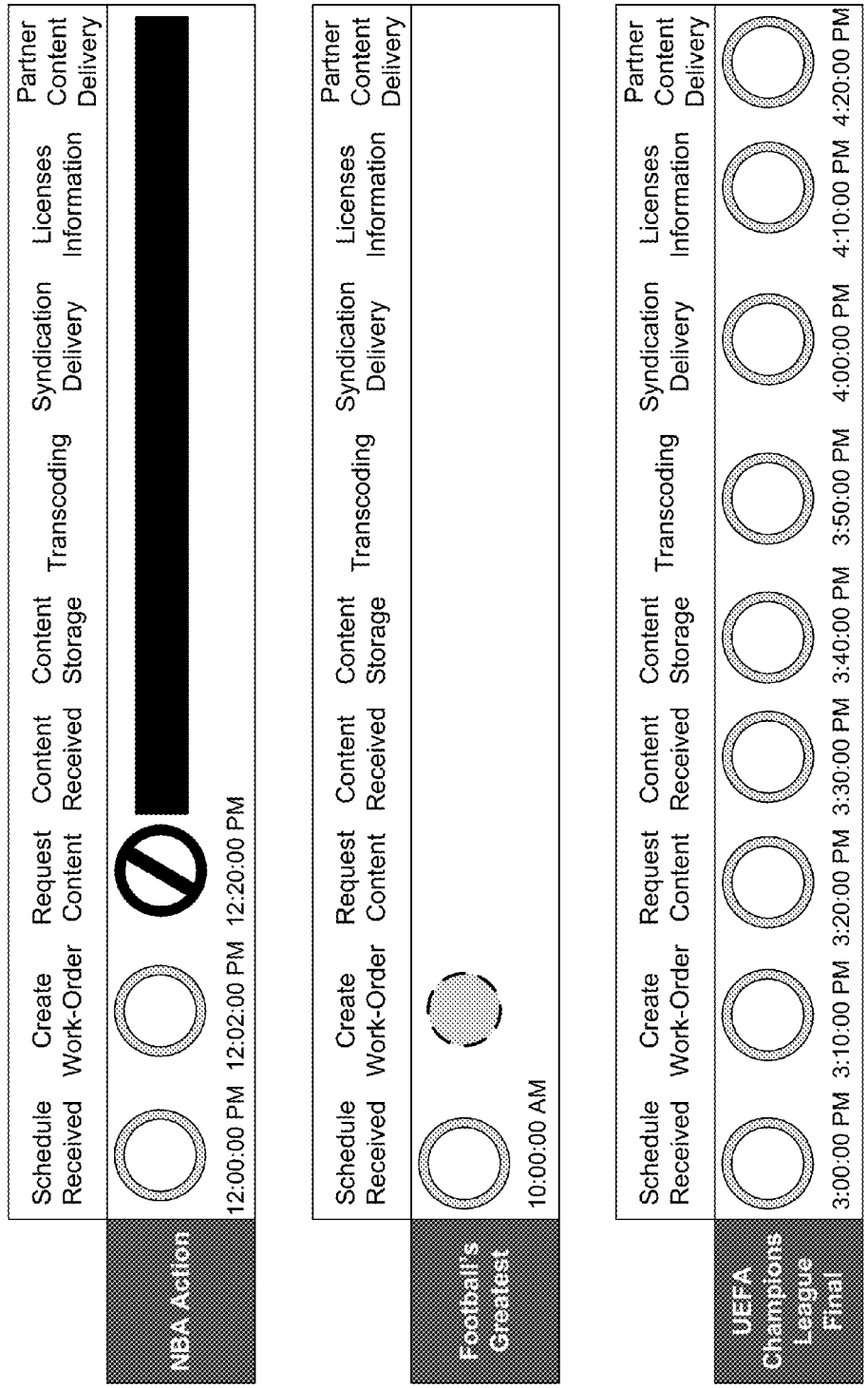

FIGS. 10A and 10B are examples of user interfaces relating to example process 600 shown in FIG. 6. For the purposes of example implementation 1000, assume that MIS device 255 has determined status information for multiple items of media content (e.g., NBA Action, UEFA Champions League Final, NBA Finals '09, Football's Greatest, and NBA Playoffs) that includes a transfer state associated with each item of media content, a KPI evaluation associated with each item of media content, and a set of forecasted completion times associated with each item of media content.

As shown in FIG. 10A, MIS device 255 may provide, for display via user device 265, a user interface that includes status information associated with the multiple items of media content. For example, as shown, the user interface may include information associated with corresponding transfer states (e.g., error, complete, in progress), information associated with corresponding KPI evaluations (e.g., failed, success), information associated with a forecasted completion of the media content delivery (e.g., 20 minutes, 50 minutes). In some implementations, the user may select (e.g., by double clicking, by hovering a cursor for a particular amount of time, etc.) an item of media content in order to view detailed status information associated with the item of media content.

FIG. 10B shows example user interfaces that include detailed status information for media content. As shown in the upper portion of FIG. 10B, the detailed status information for first media content (e.g., NBA action) may indicate that delivery of the first media content failed at 12:20:00 p.m. during a step associated with requesting the first media content.

As shown in the middle portion of FIG. 10B, the detailed status information for second media content (e.g., Football's Greatest) may indicate that delivery of the second media content is in progress at a work order creation step associated with delivering the second media content.

As shown in the lower portion of FIG. 10B, the detailed status information for third media content (e.g., UEFA Champions League Final) may indicate that delivery of the third media content was successfully completed at 4:20:00 p.m.

As indicated above, FIGS. 10A and 10B are provided merely as an example. Other examples are possible and may differ from what was described with regard to FIGS. 10A and 10B.

Implementations described herein may allow a media intelligence suite (MIS) device, associated with a content delivery system, to determine and provide a status of media content, being delivered to a client device via the content delivery system, with respect to multiple devices of the content delivery system, such as a scheduler, an acquisition manager, a transcoder, a license and product manager, a process manager, a resource manager, a delivery manager, or the like. Implementations described herein may also allow the MIS device to forecast when the media content delivery will be complete and/or may allow the MIS device to perform automated failure resolution associated with the media content delivery.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms component and element are intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms.

Further, the phrase "based on" is intended to mean "based, at least in part, on" unless explicitly stated otherwise.

What is claimed is:

1. A device, comprising:
a memory to store instructions; and
one or more processors to execute the instructions to:
receive an indication to determine status information associated with a media content delivery of media content,
the media content being delivered via a content delivery system;
determine, based on information provided by devices included in the content delivery system, progress information associated with the media content delivery,
the progress information identifying progress, associated with the media content delivery, with respect to each of a plurality of steps, associated with delivering the media content, performed by the devices included in the content delivery system;
receive schedule information associated with the media content delivery;
provide, as inputs to a forecasting algorithm, the schedule information and information that identifies the media content,
the forecasting algorithm determining forecast information based on a respective plurality of minimum times and a respective plurality of maximum times associated with each of the plurality of steps;
determine the status information, associated with the media content delivery, based on the progress information and the forecast information,
the status information indicating a status of each of the plurality of steps associated with the media content delivery; and
provide the status information,
the status information being presented for display as a visual indication of the status information in order to identify the status of each of the plurality of steps associated with the media content delivery.

2. The device of claim 1, where the one or more processors are further to:
receive schedule information associated with the media content delivery;
determine due date information, associated with the media content delivery, based on the schedule information;
compare the due date information and the progress information; and
where the one or more processors, when determining the status information, are to:
determine the status information based on comparing the due date information and the progress information.

3. The device of claim 2, where the one or more processors are to:
determine, based on comparing the due date information and the progress information, that a due date has not been satisfied,
the due date being associated with a step of the plurality of steps, and
the due date not being satisfied indicating that the step was not completed by the due date; and
automatically resolve a failure, associated with the media content delivery, that caused the step to not be completed by the due date or fail to be completed.

4. The device of claim 1, where the one or more processors are further to:
receive performance information associated with the media content delivery,
the performance information identifying a performance indicator associated with the media content delivery;
compare the performance information and the progress information; and
where the one or more processors, when determining the status information, are to:
determine the status information based on comparing the performance information and the progress information.

5. The device of claim 1, where the one or more processors are to:
determine, based on the progress information, that a failure has occurred during a step of the plurality of steps; and
restart the step in order to resolve the failure,
the step being restarted without user intervention.

6. The device of claim 1, where the forecasting algorithm is based on at least one of:
automation conditions being satisfied for the media content delivery,
the media content existing in storage, or
license and product information for the media content being available.

7. The device of claim 1, where the forecast information includes an estimated completion time for each of the plurality of steps associated with the media content delivery.

8. A non-transitory computer-readable medium storing instructions, the instructions comprising:
one or more instructions that, when executed by one or more processors, cause the one or more processors to:
receive an indication to determine status information associated with a media content delivery of media content,
the media content being delivered via a content delivery system;
receive progress information associated with the media content delivery,
the progress information being provided by one or more devices of the content delivery system, and
the progress information identifying progress, associated with the media content delivery, with respect to each of a plurality of steps associated with delivering the media content,
the plurality of steps being performed by the one or more devices of the content delivery system;
receive schedule information associated with the media content delivery;
provide, as inputs to a forecasting algorithm, the schedule information and information that identifies the media content,
the forecasting algorithm determining forecast information based on a respective plurality of minimum times and a respective plurality of maximum times associated with each of the plurality of steps;
determine the status information based on the progress information and the forecast information,
the status information indicating a status of each of the plurality of steps associated with the media content delivery; and provide, for display, the status information,
the status information being provided for display as a visual indication of the status information in order to identify the status of each of the plurality of steps associated with the media content delivery.

9. The non-transitory computer-readable medium of claim 8, where the one or more instructions, when executed by the one or more processors, further cause the one or more processors to:
receive schedule information associated with the media content delivery;
determine due date information, associated with the media content delivery, based on the schedule information;
compare the due date information and the progress information; and
where the one or more instructions, that cause the one or more processors to determine the status information, cause the one or more processors to:
determine the status information based on comparing the due date information and the progress information.

10. The non-transitory computer-readable medium of claim 9, where the one or more instructions, when executed by the one or more processors, further cause the one or more processors to:
determine, based on comparing the due date information and the progress information, that a due date has not been satisfied,
the due date being associated with a step of the plurality of steps,
the due date not being satisfied indicating that the step was not completed by the due date; and
cause a notification, indicating that the due date has not been satisfied, to be provided,
the notification being provided to inform a user that the step was not completed by the due date.

11. The non-transitory computer-readable medium of claim 8, where the one or more instructions, when executed by the one or more processors, further cause the one or more processors to:
receive performance information associated with the media content delivery,
the performance information identifying a performance indicator associated with the media content delivery;
compare the performance information and the progress information; and
where the one or more instructions, that cause the one or more processors to determine the status information, cause the one or more processors to:
determine the status information based on comparing the performance information and the progress information.

12. The non-transitory computer-readable medium of claim 8, where the one or more instructions, when executed by the one or more processors, further cause the one or more processors to:
determine, based on the progress information, that a failure has occurred during a step of the plurality of steps; and
restart the step in order to resolve the failure,
the step being restarted without user intervention.

13. The non-transitory computer-readable medium of claim 8, where the forecasting algorithm is based on at least one of:
automation conditions being satisfied for the media content delivery,
the media content existing in storage, or
license and product information for the media content being available.

14. The non-transitory computer-readable medium of claim 8, where the forecast information includes an estimated completion time for each of the plurality of steps associated with the media content delivery.

15. A method, comprising:
receiving, by a device, an indication to determine status information associated with a media content delivery of media content,
the media content being delivered via a content delivery system;
determining, by the device and based on information provided by devices included in the content delivery system, progress information associated with the media content delivery,
the progress information identifying progress, associated with the media content delivery, with respect to each of a plurality of steps, associated with delivering the media content, performed by the devices included in the content delivery system;
receiving, by the device, schedule information associated with the media content delivery;
providing, by the device, as inputs to a forecasting algorithm, the schedule information and information that identifies the media content,
the forecasting algorithm determining forecast information based on a respective plurality of minimum times and a respective plurality of maximum times associated with each of the plurality of steps;
determining, by the device, due date information associated with the media content delivery,
the due date information including information indicating when the each of the plurality of steps are to be completed;
determining, by the device, the status information, associated with the media content delivery, based on the progress information, the forecast information, and the due date information,
the status information indicating a status of each of the plurality of steps associated with the media content delivery; and
providing, by the device, the status information,
the status information being provided to allow a user to view the status information in order to identify the status of each of the plurality of steps associated with the media content delivery.

16. The method of claim 15, further comprising:
receiving schedule information associated with the media content delivery; and
determining the due date information, associated with the media content delivery, based on the schedule information.

17. The method of claim 15, where determining the status information comprises:
comparing the due date information and the progress information;
determining, based on comparing the due date information and the progress information, that a due date has not been satisfied,
the due date being associated with a step of the plurality of steps,
the due date not being satisfied indicating that the step was not completed by the due date; and resolving a failure, associated with the media content delivery, that caused the step to not be completed by the due date,
the failure being resolved without user intervention.

18. The method of claim 15, further comprising:
receiving performance information associated with the media content delivery,
the performance information identifying a performance indicator associated with the media content delivery;
comparing the performance information and the progress information; and
where determining the status information comprises:
determining the status information based on comparing the performance information and the progress information.

19. The method of claim 15, further comprising:
determining, based on the progress information, that a failure has occurred during a step of the plurality of steps; and
resolving the failure by causing the step to be performed, the failure being resolved without user intervention.

20. The method of claim 15, where the forecast information includes an estimated completion time for each of the plurality of steps associated with the media content delivery.

* * * * *